C. OYSTER.
Securing Wheels to Axles.
No. 67,794.  Patented Aug. 13, 1867.
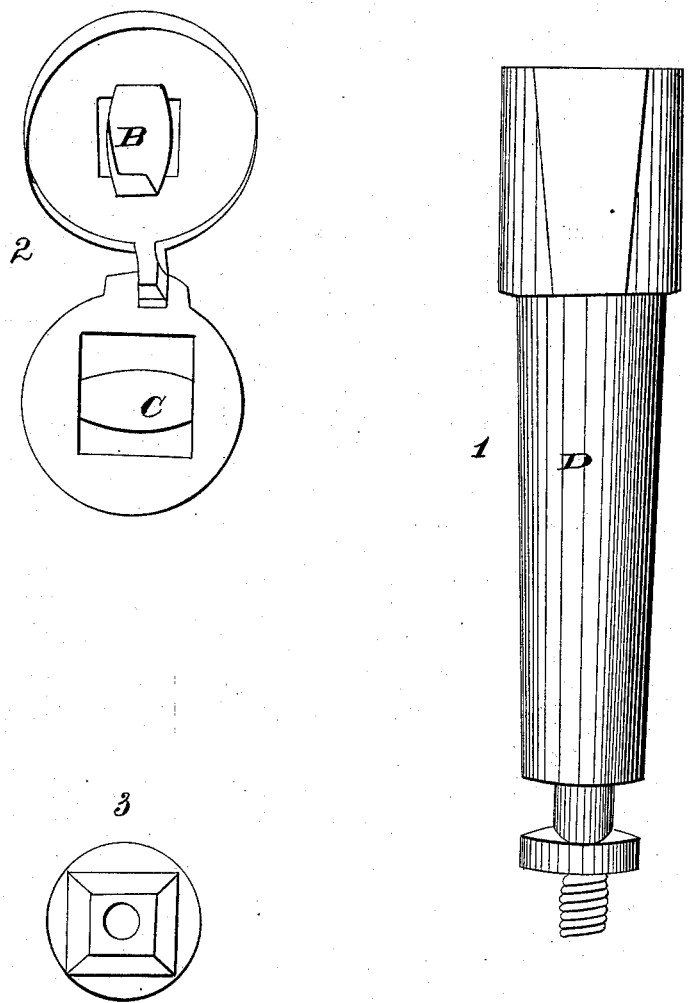
Witnesses
Frank Henderson
Chea...
Inventor:
Christian Oyster

United States Patent Office.

CHRISTIAN OYSTER, OF CHAMBERSBURG, PENNSYLVANIA.

Letters Patent No. 67,794, dated August 13, 1867.

IMPROVEMENT IN SECURING WHEELS OF VEHICLES ON THEIR AXLES.

*The Schedule referred to in these Letters Patent and making part of the same.*

TO ALL WHOM IT MAY CONCERN:

Be it known that I, CHRISTIAN OYSTER, of Chambersburg, in the county of Franklin, in the State of Pennsylvania, have invented a new and useful Improvement on the Mode of Securing Wheels to Vehicles; and I do hereby declare that the following is a full, clear, and exact description of the construction and operation of the same, reference being had to the annexed drawings, making a part of this specification, in which—

Figure 1 is a lateral view of the axle.

Figure 2, a perspective view of the hinged washer, while open.

Figure 3, a front view of the nut which secures the said washer when closed.

In fig. 1, letter D represents the spindle of the axle; letter A, the immovable key upon said spindle. In fig. 2, letters B and C indicate the openings in the hinged washer, which will be noticed to be in reversed order.

The nature of my invention consists in providing an immovable key (fig. 1, letter A) on the axle, which secures a hinged washer (fig. 2) after the nut (fig. 3) has been applied, said hinged washer acting instead of the large nut or linch-pin in common use.

To enable others skilled in the art to make and use my invention, I will proceed to describe its construction and operation.

It will be noticed that the hinged washer (fig. 2) is provided with a key-hole, (fig. 2, letters B and C,) in each half, said key-holes being in opposite directions when the washer is closed. The wheel is placed upon the spindle (fig. 1, letter D) in the ordinary manner. A common leather or gum washer is then applied, against which the hinged washer is put, the first half being reversed in order to allow the second half to be adjusted. The small nut, (fig. 3,) to be put on the end of the spindle, (fig. 1,) is solely for the purpose of keeping the hinged washer closed.

What I claim as my invention, and desire to secure by Letters Patent, is—

The immovable key and the hinged washer, constructed substantially as described, for the purpose specified.

CHRISTIAN OYSTER.

Witnesses:
D. A. WERTZ,
BARNET EARLEY.